May 19, 1936. T. B. McDIARMID 2,041,010
HOLDER FOR SHARPENING RAZOR BLADES
Original Filed March 14, 1933
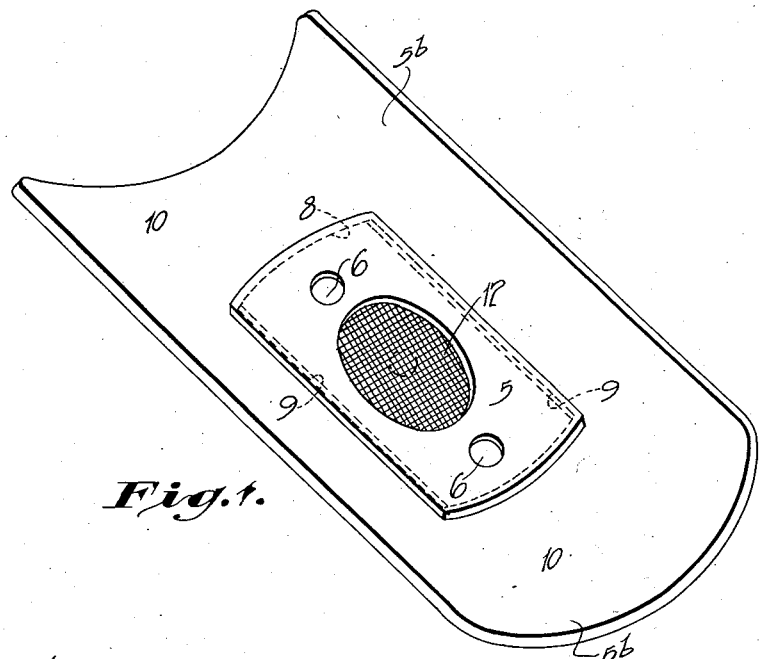
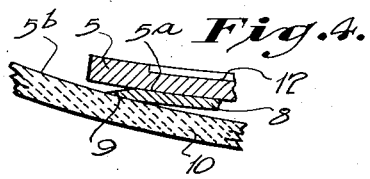
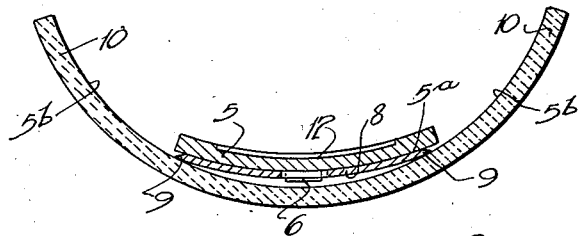
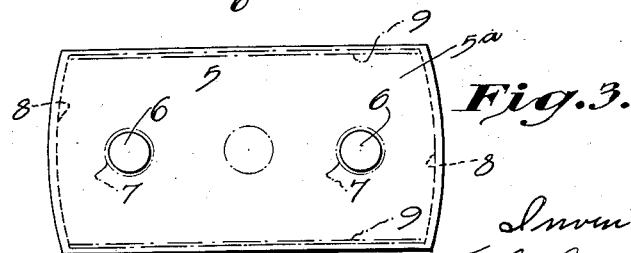
Inventor:
T. B. McDiarmid Patented May 19, 1936

2,041,010

UNITED STATES PATENT OFFICE 2,041,010

HOLDER FOR SHARPENING RAZOR BLADES

Thomas Bartlett McDiarmid, Melbourne, Victoria, Australia

Application March 14, 1933, Serial No. 660,712. Renewed September 13, 1935. In Australia March 19, 1932

3 Claims. (Cl. 51—216)

This invention has reference to improvements in and relating to holders for sharpening razor blades and the like, and is directed more particularly to a means for re-sharpening razor blades adapted for use with safety razors, so as to prolong the useful life of the blade.

It is recognized that blades for safety razors although comparatively cheap at the purchase price, are over a lengthy period actually a very costly item, as a blade at present has to be discarded after very little use.

A method employed at present in sharpening razor blades consists in inserting the blade by hand into a glass of water and reciprocating the said blade to and fro to re-sharpen the cutting edges thereof.

Although this practice is satisfactory, it requires considerable skill on the part of the user, and while it may be successful in certain instances, other users having not the same skill do not obtain the result desired.

My invention therefore has for its object to provide a holder for the blade, such holder being of a shape that may be readily retained by the user, preferably in the manner of a finger piece, its particular shape being characterized in that it is substantially convex, whereby the blade will be set in use at a definite inclination to the curved edges of a glass or portion thereof to effectively re-sharpen the edges of the blade while inserted in the water and reciprocated in the usual manner across the surface of glass or a segment of glass.

This invention is characterized by the provision of a holder substantially convex and of dimensions substantially equivalent to a razor blade, said holder having means to retain the blade thereon, and if desired, means to provide a grip for the fingers of the user, whereby in operation, the cutting edges of the blade will be set in correct relationship or angle of bevel to a glass or segment of a glass disposed in water and on the reciprocation of the holder and blade taking place, the cutting edges assume the definite angle with the said glass necessary for re-sharpening purposes.

It is a feature of the invention that the convex holder is preferably used in conjunction with a segment of glass having a concave surface across which the blade is reciprocated on the holder, the segment of glass being of lesser radii than the convex holder whereby the blade conforming to the shape of said holder has its cutting edges retained at a constant bevel or angle to the surface of glass in order to effect the sharpening thereof.

Now in order that the invention may be more readily understood reference will now be made to the accompanying drawing in which:—

Figure 1 is a perspective view of a holder for razor blades constructed in accordance with my invention.

Figure 2 is a section of the holder with a blade attached.

Figure 3 is an underside plan of the holder.

Figure 4 is an enlarged view of the holder with the blade during the sharpening operation.

According to one form of carrying my invention into practical effect, I provide a member or holder 5 substantially rectangular in outline but with rounded edges and of a convex shape. This member 5 is formed to correspond in shape with the outlines of a standard razor blade for use with safety razors, said holder 5 being formed on the underside 5a with spaced lugs or projections 6 to engage with the usual retaining slots or holes 7 in the blade 8 in the manner illustrated in Figure 2.

These lugs or projections 6 are of sufficient depth to extend through the holes 7 on the blade whereby during operation of the holder, the said lugs 6 impinge on the curved surface of the glass or segment which causes the razor blade to conform to the shape of said holder in order to bring the cutting edges of the blade into the required angle against the curved glass or segment.

As the steel in the said blades of the class described is usually of the ribbon type they readily conform to the shape of the holder 5 for the reason that the lugs or projections 6 on the holder bear against the curved surface of the glass.

The convex shape of the holder 5 ensures that an inclination is effected to the blade 8, while it is retained on the said holder 5, and the inclination is such that the cutting edges 9 of the blade are then set at the required angle or bevel to the edges of a glass or glass segment 10 on to which water may be poured or allowed to drip.

It is preferred in my invention to use the segment of glass 10 which may be of plain, corrugated, fluted or other uneven surface in combination with the holder 5 described, whereby the segment of glass 10 may, if desired, be disposed in a basin of water and then the blade 8 secured to the holder 5 and reciprocated in the usual manner against the curved surface of the segment of glass to effect the sharpening thereof, and as the lugs or projections 6 of the holder impinge constantly on the curved surface of the glass segment a constant pressure is exerted on the blade 18 while the holder is reciprocated as a finger piece.

If desired, the upper surface of the holder 5 may be formed with a knob to receive the finger of the user, but it is preferred that a shaped, concave recess 12 suitably milled be provided in the said holder 5 to receive the finger of the user so that the said holder 5 may be gripped or held for operation.

In operation the blade 8 is placed in position on the convex undersurface of the holder 5 which is reversed to bring the said blade into contact with the wet concave surface 5b of the glass segment 10, while the lugs or projections 6 impinge on said surface 5b which being of lesser radii than the convex holder ensures that the cutting edges of the blade 8 maintain a constant inclination or bevel to the rounded and wet surface of the glass during the reciprocation of the holder 5.

The blade initially lies flat but on pressure being applied by the finger on the holder, the said blade 8 conforms to the convex shape of said holder which brings the cutting edges into coincidence with the curved surface of the glass, (see Figure 4) and the holder 5 is then reciprocated by a finger of the user impinging on the milled recess 12, the reciprocation causing the cutting edges of the blade to be continuously rubbed at the desired angle or bevel on the wet glass surface and the action is continued on one side of the blade until an even cutting surface is achieved after which the blade is reversed on the holder 5 and again reciprocated until a satisfactory condition of sharpness exists in relation to both sides of the said blade.

The holder 5 is therefore readily manipulated as a finger piece to perform the sharpening operation described while the blade readily conforms to its shape and is retained thereon by means of the spaced lugs or projections 6 which engage or constantly impinge on the glass surface as illustrated.

By utilizing the holder 5 the blade may be expeditiously sharpened on the segment of glass 10 suitably moistened as described but it will be readily understod that the holder may be used in conjunction with a glass receptacle containing water.

I do not wish to confine myself to the herein-described details of construction but desire it to be understood that various improvements and modifications may be embodied without departing from the spirit and scope of the invention.

What I claim as my invention and desire to secure by Letters Patent is:—

1. Means for sharpening razor blades, comprising a metallic member corresponding in outline to the shape of a safety razor blade, the said member being curved in cross section and convex on its blade-engaging surface, a milled recess in the upper surface of said member so that it can be used as a finger piece, a plurality of spaced lugs on the blade engaging surface to register with and extend through slots in the razor blade to hold the blade in position and to cause said blade, when it abuts the curved surface of a smooth vitreous segment and when downward pressure is applied against the upper surface of said member, to conform to the shape of said member, with both cutting edges thereof at a constant angle to the curved surface of said vitreous segment.

2. Means for sharpening razor blades, comprising a metallic member corresponding in outline to the shape of a safety razor blade, the said member being curved in cross section and convex on its blade-engaging surface, a central milled recess in the upper surface of said member so that it can be used as a finger piece, a plurality of spaced lugs on the blade engaging surface to register with and extend through slots in the razor blade to hold the blade in position and to cause said blade, when it abuts the curved surface of a smooth vitreous segment and when downward pressure is applied against the upper surface of said member, to conform to the shape of said member, with both cutting edges thereof at a constant angle to the curved surface of said vitreous segment.

3. Means for sharpening razor blades, comprising a metallic member corresponding in outline to the shape of a safety razor blade, the said member being curved in cross section and convex on its blade-engaging surface, a milled recess in the upper surface of said member so that it can be used as a finger piece, a plurality of spaced lugs on the blade engaging surface to register with and extend through slots in the razor blade to hold the blade in position and to cause said blade, when it abuts the curved surface of a smooth vitreous segment and when downward pressure is applied against the upper surface of said member, to conform to the shape of said member, and a curved smooth vitreous segment, both cutting edges of the razor blade being maintained by said member at a constant angle to the curved surface of the said vitreous segment for reciprocation thereagainst.

THOMAS BARTLETT McDIARMID.